United States Patent
Rodney et al.

(10) Patent No.: US 7,318,471 B2
(45) Date of Patent: Jan. 15, 2008

(54) SYSTEM AND METHOD FOR MONITORING AND REMOVING BLOCKAGE IN A DOWNHOLE OIL AND GAS RECOVERY OPERATION

(75) Inventors: Paul F. Rodney, Spring, TX (US); Jeroen J. Groenenboom, The Hague (NL); Wei Han, Missouri City, TX (US); James R. Birchak, Spring, TX (US); Denis P. Schmitt, Katy, TX (US); Tim W. Geerits, Houston, TX (US); Eugene J. Linyaev, Houston, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 453 days.

(21) Appl. No.: 10/878,738

(22) Filed: Jun. 28, 2004

(65) Prior Publication Data

US 2005/0284625 A1    Dec. 29, 2005

(51) Int. Cl.
*E21B 28/00* (2006.01)
*E21B 43/00* (2006.01)

(52) U.S. Cl. ............... 166/250.01; 166/66; 166/177.2

(58) Field of Classification Search ........... 166/250.01, 166/66, 177.2
See application file for complete search history.

(56) References Cited

U.S. PATENT DOCUMENTS 2,999,557 A    9/1961    Smith et al.
4,790,393 A    12/1988   Larronde et al.
6,478,107 B1   11/2002   Birchak et al.
6,672,163 B2   1/2004    Han et al.
2001/0035312 A1  11/2001  Han et al.
2006/0086498 A1*  4/2006  Wetzel et al. .......... 166/250.12
2006/0165344 A1*  7/2006  Mendez et al. ................ 385/13

FOREIGN PATENT DOCUMENTS

EP         1 205 632         5/2002
WO     WO 2004/074633        9/2004

OTHER PUBLICATIONS

Columbia University, *Shear Sonic Tool (SST)*, (available at www.ldeo.columbia.edu/BRG/TOOLS_TECH/TOOLS/shearsonic.html).

Fogal, et al., *Acoustic Logging Tool Collects Shear Data Downhole*, Drilling Contractor, Mar./Apr. 2003, pp. 28-29.

Patent Application entitled "Vibrating System and Method for Use in Scale Removal and Formation Stimulation In Oil and Gas Recovery Operations," by Lyle V. Lehman et al., filed Aug. 5, 2003, U.S. Appl. No. 10/634,254.

Patent Application entitled "System and Method for Scale Removal in Oil and Gas Recovery Operations," by Lyle V. Lehman et al., filed Nov. 6, 2003, U.S. Appl. 10/702,799.

(Continued)

*Primary Examiner*—Frank Tsay
(74) *Attorney, Agent, or Firm*—John W. Wustenberg; Haynes & Boone, LLP

(57) ABSTRACT

A system and method for determining blockage in a wellbore containing fluid and/or in a formation adjacent the wellbore, according to which energy is generated in the fluid and variables associated with the energy are measured.

104 Claims, 6 Drawing Sheets

OTHER PUBLICATIONS

Patent application entitled "Vibrating System and Method For Use In Sand Control and Formation Stimulation In Oil and Gas Recovery Operations," by Lyle V. Lehman et al., filed Aug. 28, 2003, U.S. Appl. No. 10/650,186.

Schlumberger: "DSI Dipole Shear Imager" Aug. 1995, Schlumberger Oilfield Marketing Services, SMP-9200, XP002338604.

Foreign communication from related counter part application dated Nov. 7, 2005.

* cited by examiner

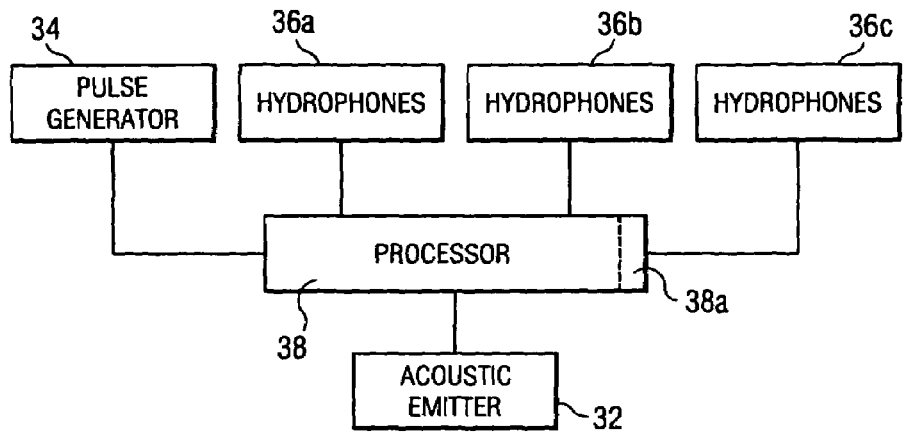
*Fig. 2*
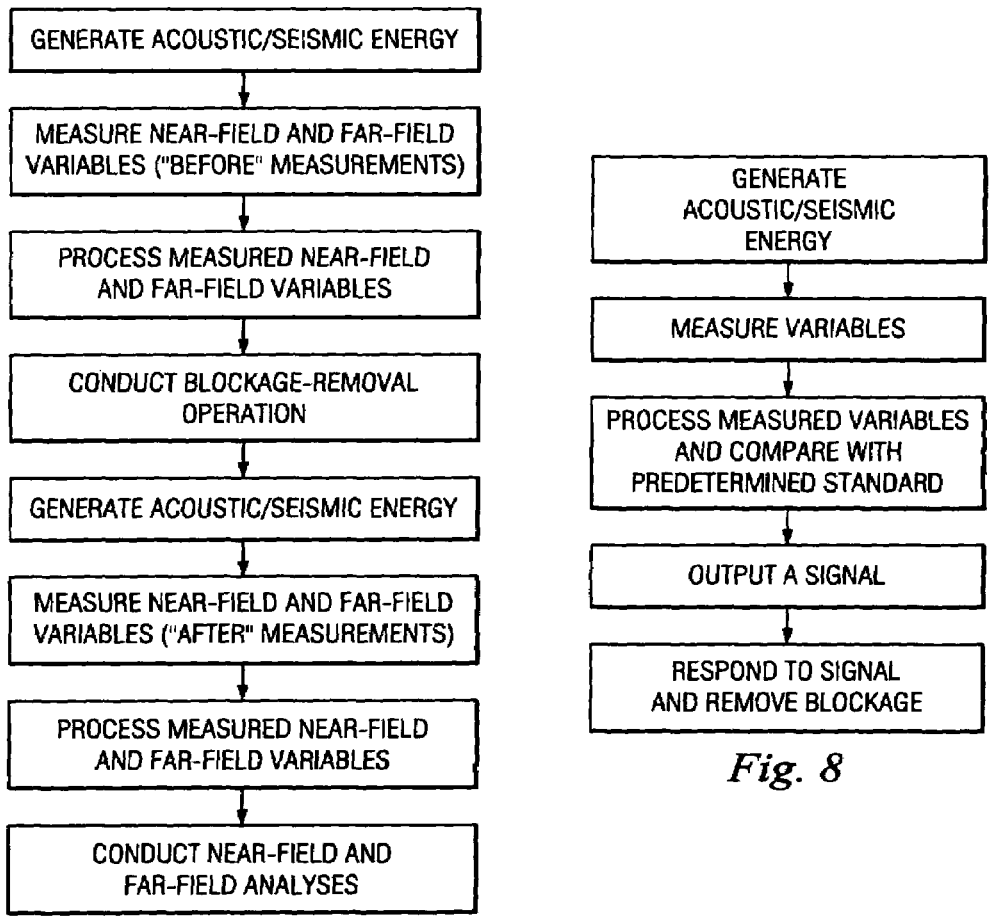
*Fig. 7*
*Fig. 8*

SYSTEM AND METHOD FOR MONITORING AND REMOVING BLOCKAGE IN A DOWNHOLE OIL AND GAS RECOVERY OPERATION

BACKGROUND

Many oil and gas downhole recovery operations, especially high-rate, high-permeability completions, produce reservoir fluids that contain fines, or formation sand. Therefore, support and screening devices, such as screens, slotted liners, and the like, have been utilized to support a gravel pack, or the like, in the well to stabilize the formation while permitting the recovered fluids to pass from the formation into the wellbore yet preventing passage of any fines or formation sand with the recovered fluids.

These support devices and gravel packs are often placed in a pressure-drop zone which subjects them to contamination from scaling (salt crystal growth), mud cake, mud filtrate, fines in the formation wall, and other materials (hereinafter alone and collectively referred to as "blockage") that form on the support devices, the gravel packs, and/or on the wall of the wellbore adjacent the formation during production of the reservoir fluids. The build up of blockage in this manner can reduce and even block the flow of the reservoir fluids in the wellbore and can pose serious problems for sustaining well production.

To combat these problems various types of cleaning tools have been developed to clean the blockage. For example, relatively high-power sonic cleaners are used that include a vibrating component that causes the blockage to dislodge from the screens, gravel packs and wellbore wall.

However, it is very important for the operator of these cleaning devices to be able to timely monitor the effectiveness of the cleaning tool to permit better control of the cleaning treatments and, in addition, to permit analysis and quantification of the well productions. Prior art downhole monitoring, or measuring, techniques mainly use fluid mechanics (fluid pressure drop, spinners, turbines, etc), electromagnetics (capacitance or resistance), or acoustics (ultrasonic Doppler, etc.), all of which have certain disadvantages, including, for example, the inability to determine where the downhole production fluid flow originates and how much the flow is enhanced due to stimulation. Also some of these techniques require separate deployment of test equipment that is costly in terms of rig time.

Therefore, what is needed is a system and method for monitoring the build-up of blockage, for removing the blockage, and for measuring the effectiveness of the removal process, while eliminating the disadvantages of the prior art.

BRIEF DESCRIPTION OF THE DRAWINGS

FIG. 2 is a diagrammatic view depicting the connections between various components of the embodiment of FIG. 1.

FIG. 7 is a diagrammatic view depicting the operational steps of one possible mode of operation of the embodiment of FIG. 1.

FIG. 8 is a diagrammatic view depicting the operational steps of another possible mode of operation of the embodiment of FIG. 1.

DETAILED DESCRIPTION

Figure 1:
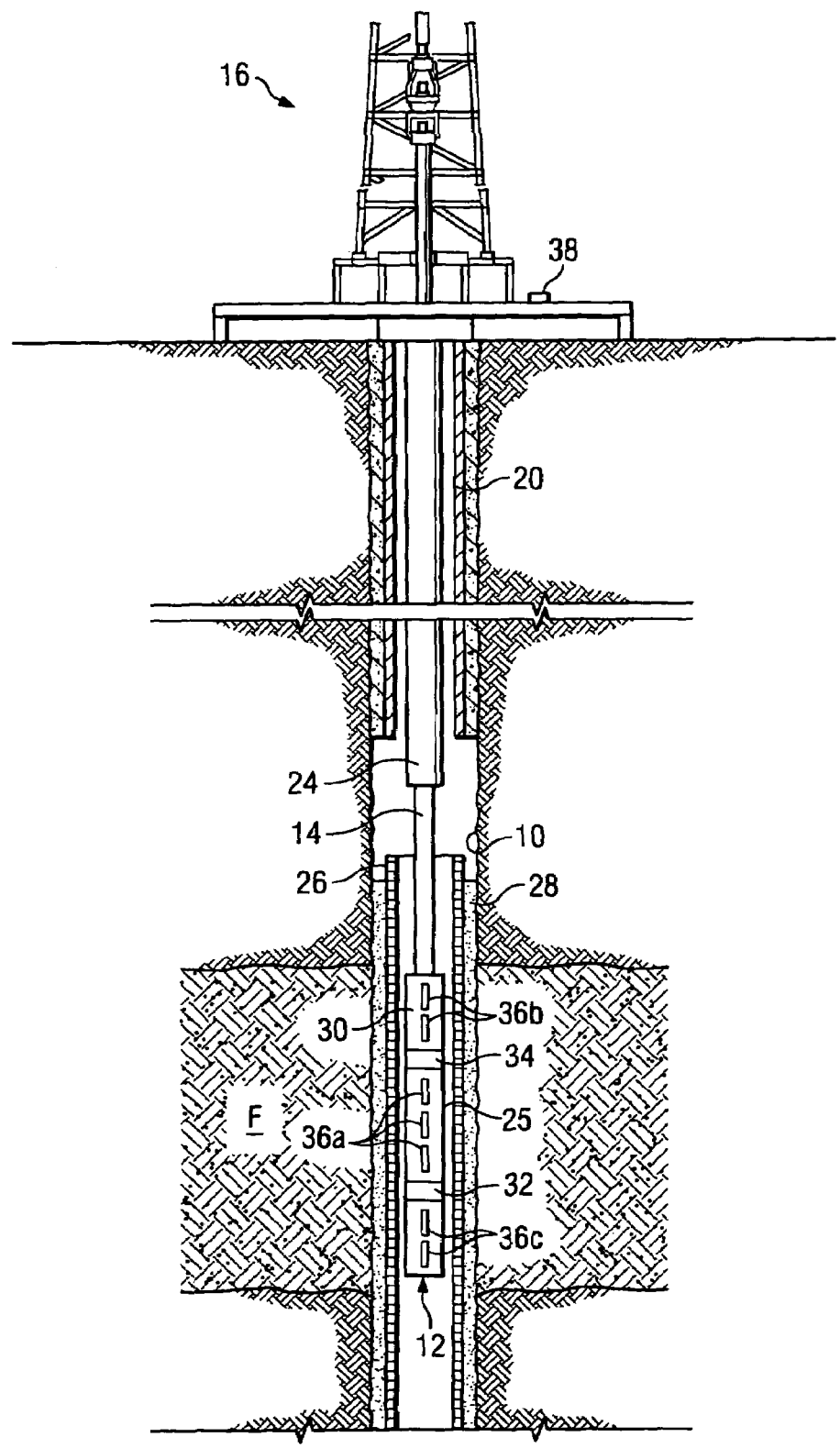
FIG. 1 is a partial elevational/partial sectional/partial schematic view, not necessarily to scale, depicting a system according to one embodiment, the system including a pulse generator 34.

Referring to FIG. 1 of the drawings, the reference numeral 10 refers to the bore of a completed well penetrating a subterranean ground formation F for the purpose of recovering hydrocarbon fluids from the formation. A tool 12 is lowered into the wellbore 10 to a predetermined depth by a string 14, in the form of coiled tubing, jointed tubing, wire line, or the like, which is connected to the upper end of the tool. The tool 12 has a center axis and contains blockage removal and monitoring equipment that will be described.

The string 14 extends from a rig 16 that is located above ground and extends over the wellbore 10. The rig 16 is conventional and, as such, includes support structure, a motor driven winch, or the like, and other associated equipment for receiving and supporting the tool 12 and lowering it to a predetermined depth in the wellbore 10 by unwinding the string 14 from the winch. It will be assumed that the well is in production and that production fluids are present in the annulus between the tool 12 and the formation F.

The upper portion of the wellbore 10 can be lined with a casing 20 which is cemented in the wellbore by introducing cement in an annulus formed between the inner surface of the wellbore 10 and the outer surface of the casing, all in a conventional manner. Production tubing 24, having an outer diameter greater than that of the tool 12 but less than that of the casing 20, is installed in the wellbore 10 in a conventional manner and extends from the ground surface to a predetermined depth in the casing to provide a passage for the flow of the production fluids from the formation F to the rig 16 for processing.

A cylindrical screen 26 is disposed in the wellbore 10 between the tool 12 and the wellbore wall adjacent the formation F, and a gravel pack 28 is disposed between the screen and the latter wall to stabilize the formation F while permitting the production fluids to pass from the formation F into the wellbore 10 while preventing passage of any fines or formation sand with the fluids. Since the screen 26 and the gravel pack 28 are conventional, they will not be described in further detail.

The tool 12 includes an elongated tubular body member 30 having an acoustic emitter 32 mounted thereon. The emitter 32 operates in a conventional manner and, as such, emits acoustic signals sufficient to cause vibration of the screen 26 and the gravel pack 28. As a result, at least a portion of any blockage accumulating on the screen 26, the gravel pack 28, and the wellbore wall adjacent the formation F is removed. This removal technique is disclosed in detail in co-pending patent application Ser. No. 10/650,186, filed Aug. 28, 2003, and Ser. No. 10/624,254, filed Aug. 5, 2003, the disclosures of which are incorporated herein by reference in their entirety.

A source of acoustic/seismic energy, in the form of a pulse generator 34, is mounted on the body member 30 and is axially spaced from the emitter 32. The pulse generator 34 is adapted to generate pressure pulses in a predetermined frequency range that cause a periodic vibration disturbance in the production fluids in the wellbore 10 and in the formation F to propagate energy through, and/or on the surface of, the fluids and cause corresponding pressure waves in the fluids. The pulse generator 34 will be described in detail later.

A near-field array of three axially spaced hydrophones 36a, each consisting of a calibrated receiver, is also mounted to the outer surface of the body member 30. The hydrophones 36a extend between the emitter 32 and the pulse generator 34, and are in the acoustic near field of the pulse generator. The hydrophones 36a function in a conventional manner to measure the acoustic/seismic energy, in the form of the pressure waves, in the fluids in the wellbore 10 and in a relatively shallow portion of the formation F with relatively high resolution, which pressure waves are caused by the pressure pulses from the pulse generator 34 as will be explained.

Two far field hydrophones 36b are mounted on the body member 30 near the upper end thereof as viewed in FIG. 1, and two additional far field hydrophones 36c are mounted on the body member 30 near the lower end thereof. The hydrophones 36b and 36c are axially spaced from the emitter 32 and the pulse generator 34, and are in the acoustic far field of the pulse generator. The hydrophones 36b and 36c are identical to the hydrophones 36a and, as such, consist of a calibrated receiver that measures the pressure waves in the fluids in the wellbore 10 and in a relatively deep portion of the formation F, which pressure waves are caused by the pressure pulses from the pulse generator 34 and guided by the inner and outer walls of the fluid annulus between the tool 12 and the formation F.

Referring to FIGS. 1 and 2, a signal processor 38 is provided at the rig 16 and is electrically connected to the pulse generator 34, the hydrophones 36a, 36b, and 36c and to the acoustic emitter 32 in any conventional manner. The processor 38 can include, or be in the form of, a CPU, such as a microprocessor, having a memory bank 38a, along with data interfaces for the pulse generator 34, the hydrophones 36a, 36b, and 36c and the acoustic emitter 32. The processor 38 also has multiple channels for the hydrophones 36a, 36b, and 36c, and is adapted to acquire the data measured by each hydrophone and process them in a manner to be described. The processor 38 includes computer readable media having a plurality of instructions that are stored in the memory bank 38a. The instructions are adapted to determine blockage in the wellbore 10, the screen 26, the gravel pack 28, and the formation F based on input from the hydrophones 36a, 36b, and 36c, and may activate the acoustic emitter 32 accordingly as will be further described.

Figure 3:
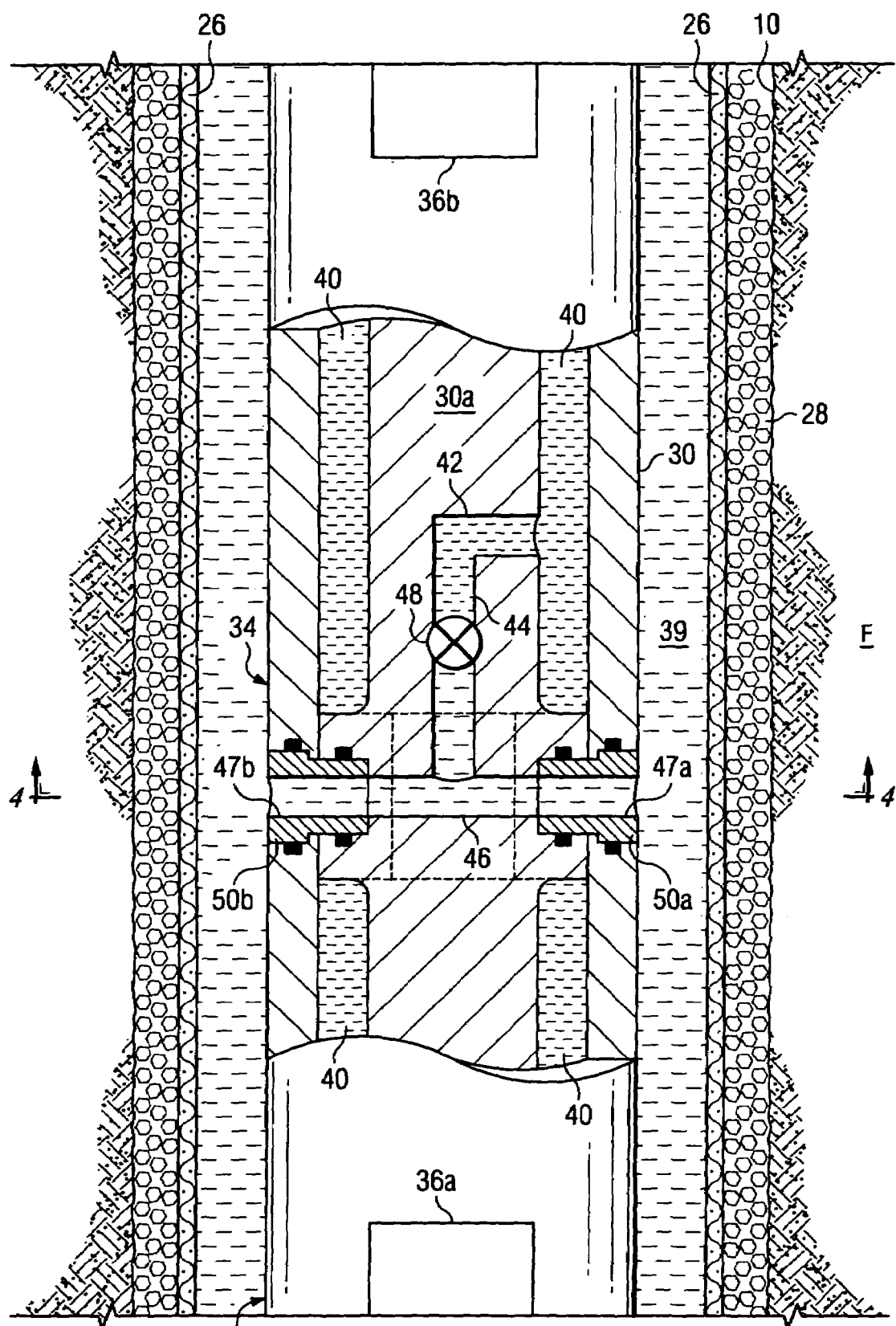
FIG. 3 is a partial elevational/partial sectional/partial schematic view, not necessarily to scale, depicting the pulse generator 34 of FIG. 1 according to one embodiment.
Figure 4:
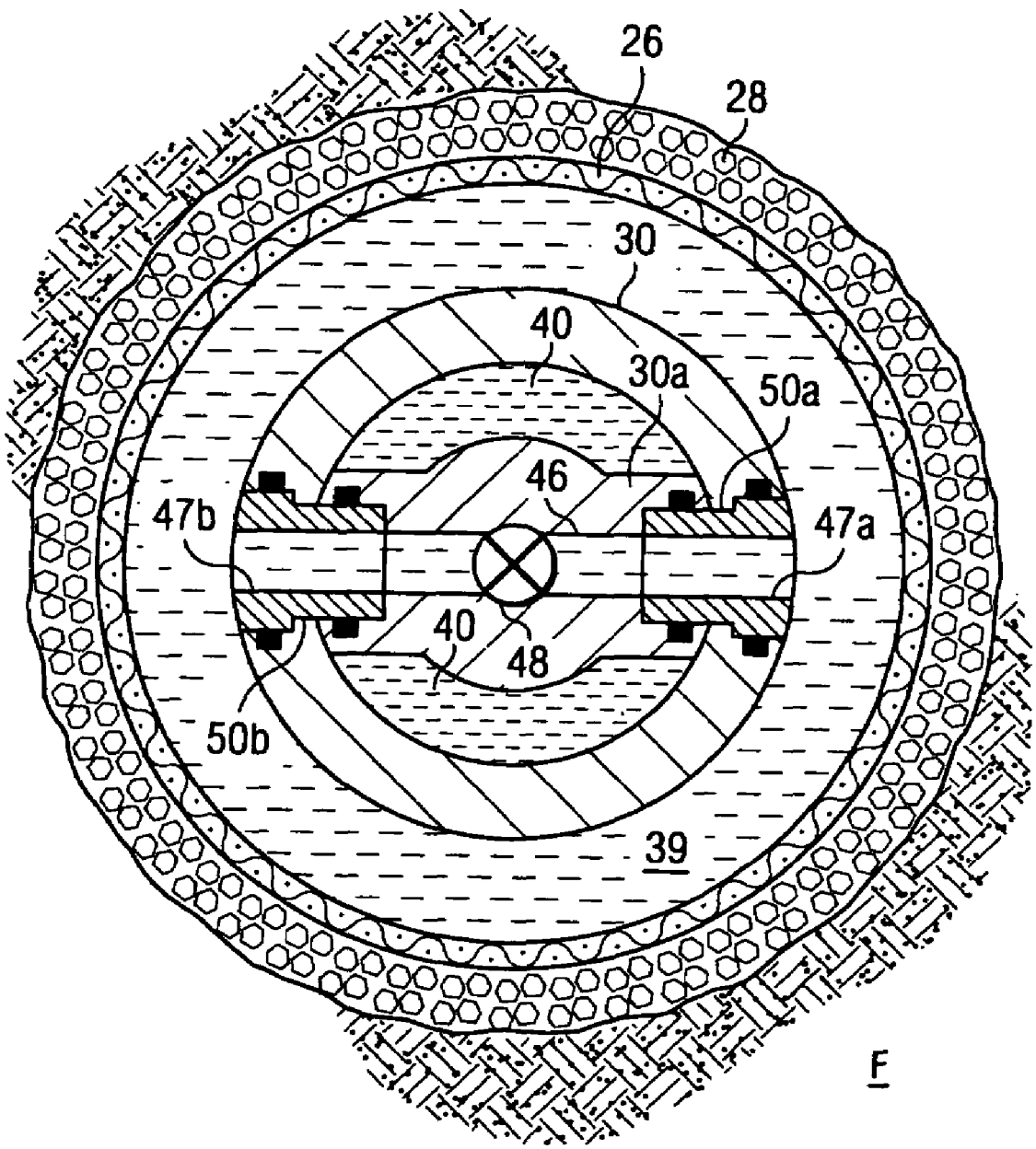
FIG. 4 is a sectional view of the pulse generator 34 of FIG. 3 taken along the line 4-4.

An embodiment of the pulse generator 34 is shown in FIGS. 3 and 4 and includes a mandrel, or solid cylindrical body member 30a, extending within the tubular body member 30, with the outer surface of the body member 30a abutting the inner surface of the member 30. It is further understood that the tubular body member 30 may be connected to the solid body member 30a in any conventional manner. The outer surface of the tubular body member 30 is spaced from the inner surface of the screen 26 to form an annulus 39 which receives production fluid from the formation F and allows it to pass to the production tubing 24 (FIG. 1).

An annular channel 40 is formed within the body member 30a located adjacent the body member 30, and extending along the axial length of the tool 12. Although not clear due to the plane of the sectional view of FIG. 3 it is understood that the upper portion of the channel 40 shown in FIG. 3 connects, or communicates with, the lower portion of the channel. In this context, and although not shown, it is understood that the lower portion of the channel 40 can be in fluid communication with the wellbore 10 via nozzles or other types of orifices.

A radial bore 42 is formed in the body member 30a and extends from the channel 40 to an axial bore 44 which, in turn, extends to a radial through bore 46 that registers with two ports 47a and 47b that extend through diametrically opposite portions of the body member 30. A pulser valve 48 is disposed in the bore 44 and is in electrical communication with the processor 38 or other electronic control circuitry located at the ground surface.

Two bushings 50a and 50b, each having o-ring seals extending around their outer surfaces, extend through the body member 30, around the ports 47a and 47b and into the body member 30a around the respective end portions of the through bore 46. The bore 46 is thus in fluid communication with the annulus 39 via the bushings 50a and 50b.

In operation, it will be assumed that the string 14 is in the form of coiled tubing, a portion of which extends within the production tubing 24. Pressure pumps (not shown) at the ground surface pump completion fluid down the coiled tubing forming the string 14, and into and through the channel 40 in the body member 30a of the tool 12, with the completion fluid in the channel 40 being at a higher pressure than the fluid in the annulus 39.

The valve 48 is initially closed, and, to generate a pressure pulse, the processor 38 or equivalent electronic control circuitry sends a signal to the valve 48 to rapidly open the valve 48 in any conventional manner (such as with a solenoid) so that the completion fluid rapidly flows from the channel 40 through the bores 42, 44 and 46 and out into the annulus 39 via the ports 47a, 47b, thereby discharging relatively-high-pressure completion fluid into the annulus 39. This discharge is momentary, however, because the processor 38 (or the equivalent electronic control circuitry) closes the valve 48 a fairly short time after it opens, thereby preventing this fluid flow. This closing of the valve can also be in any conventional manner such as by sending another signal or ceasing the transmission of the signal that originally opened the valve 48.

The momentary discharge of relatively-high-pressure completion fluid into the annulus 39 serves as the pressure pulse which generates pressure waves in the fluid in or surrounding the wellbore 10, the screen 26, the gravel pack 28 and the formation F. A series of pressure pulses may be generated by repeatedly opening and closing the valve 48 in the above manner.

Thus, near-field pressure transients with controlled rise and fall times may be generated. The frequency, repetition time, and strength of the pressure pulses generated by the pulse generator 34 may be adjusted by controlling different variables such as, for example, the open and close times of the valve 48 and/or the pressure differential between the channel 40 and the annulus 39.

It is understood that the above configuration could be operated in another manner according to which the direction of fluid flow in the channel 40 is reversed, that is, the pumps at the ground surface pump fluid (completion or production) down through the annulus 39, into the channel 40 via nozzles or other types of orifices disposed in a lower portion of the body member 30 (not shown in FIGS. 3 and 4), up through the channel 40, and into the coiled tubing forming the string 14. Alternately, the pressure in the string 14 could be reduced at the ground surface so that pressure in the formation F forces fluid into the nozzles or other types of orifices, up through the channel 40, and into the string 14.

In both of these cases the fluid in the annulus 39 would be at a higher pressure than the fluid in the channel 40. The valve 48 would be opened and closed in the manner discussed above to generate a pressure pulse, but the pressure in the channel 40 would increase as a result of the opening of the valve, rather than decrease as is the case with the previous operation.

Figure 5:
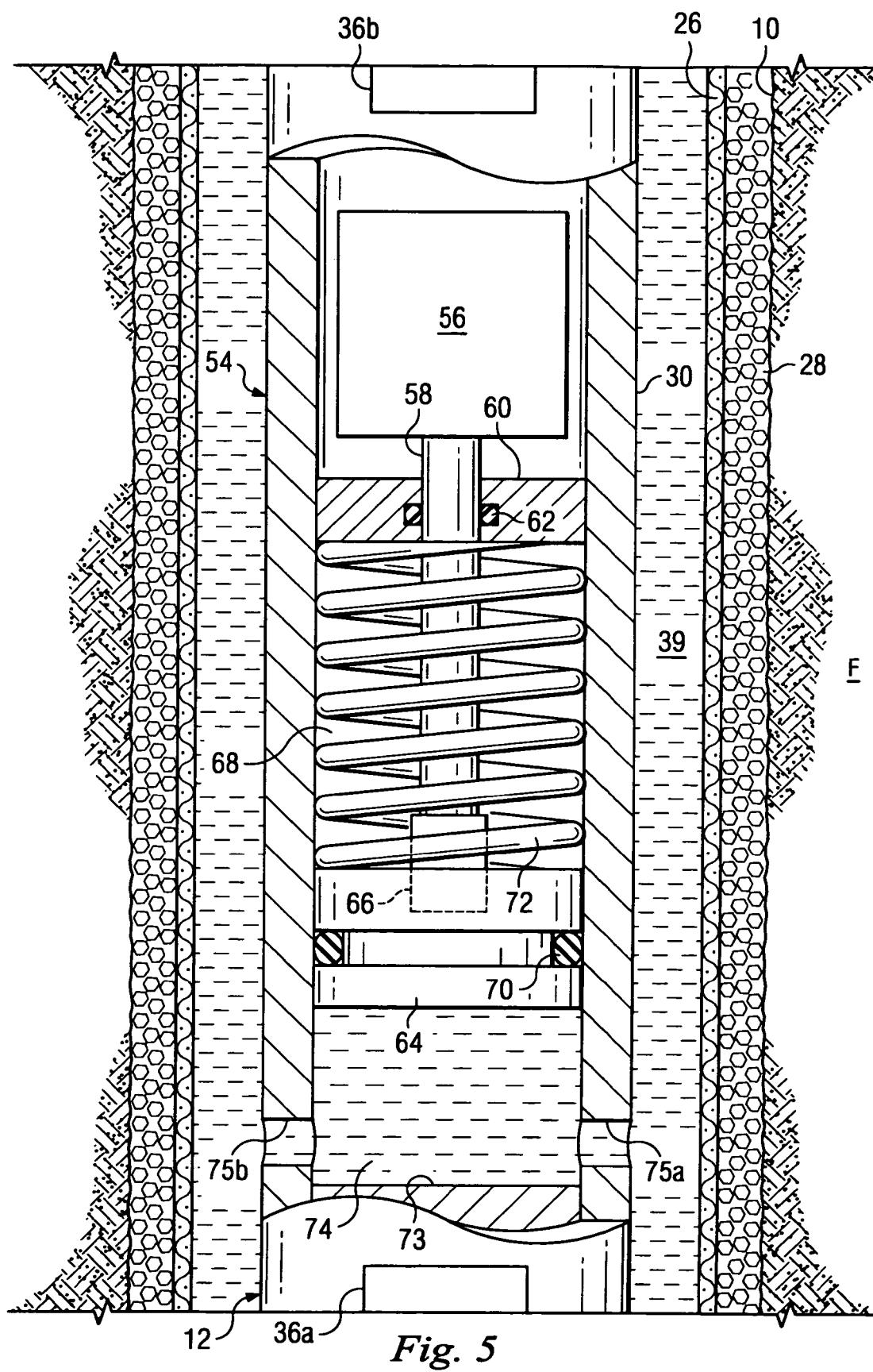
FIG. 5 is a partial elevational/partial sectional/partial schematic view, not necessarily to scale, depicting the pulse generator 34 of FIG. 1 according to an alternate embodiment.

Referring to FIG. 5, the reference numeral 54 refers, in general, to a pulse generator according to another embodiment. The pulse generator 54 includes an actuator 56 mounted in any conventional manner within the tubular body member 30. Since the actuator 56 may be in the form of a conventional gear motor or some other type of electric or hydraulic actuator it will not be described in detail.

A shaft 58 extends downwardly from the actuator 56 and is through a horizontal wall 60 that is mounted in a conventional manner in the body member 30. A seal ring 62 extends in an annular groove in the wall 60 and sealingly engages the shaft 58.

A piston 64 is connected to the shaft 58 by a conventional catch-release mechanism 66 and defines, with the body member 30 and the wall 60, a variable-volume chamber 68 which is filled with a compressible fluid. The piston 64 includes a seal ring 70 disposed in an annular groove extending around the outer surface of the piston that seals off the chamber 68. A spring 72 extends around the shaft 58 in a coaxial relation thereto and is in contact with both the wall 60 and the piston 64.

A horizontal wall 73 is mounted in a conventional manner in the body member 30 in a spaced relation to the wall 60 and defines, with the lower surface of the piston 64 and the inner wall of the body member 30, a variable-volume chamber 74. The chamber 74 is in fluid communication with the wellbore 10 via a plurality of ports formed through the body member 30, with two of the ports being shown by the reference numerals 75a and 75b, respectively.

In the embodiment of FIG. 5 the string 14 is in the form of a wire line and it will be assumed that the shaft 58 is initially connected to the piston 64 via the catch-release mechanism 66. The actuator 56 is actuated from the processor 38 or equivalent electronic control circuitry to draw the shaft 58, and therefore the piston 64, upwardly, as viewed in the drawing. As the piston 64 moves upwardly, as viewed in the drawing, both the compressible fluid in the chamber 68 and the spring 72 in the chamber 68 are compressed, while production fluid in the wellbore 10 is also drawn into the chamber 74 via the ports 75a and 75b.

After the spring 72 is compressed to a predetermined compression, the catch-release mechanism 66 releases the piston 64 in any conventional manner, releasing the stored energy in the spring 72. The spring 72 expands and pushes the piston 64 rapidly downward, forcing the production fluid in the chamber 74 out of the chamber at a relatively high pressure and into the annulus 39 via the ports 75a and 75b. This creates a pressure pulse which generates the pressure waves in the fluid in or surrounding the wellbore 10, the screen 26, the gravel pack 28 and the formation F.

To generate a second pressure pulse, the actuator 56 lowers the shaft 58 downwards until the catch-release mechanism 66 engages and locks on to the piston 64. The above-described process is then repeated, culminating with the piston 64 rapidly forcing production fluid out of the chamber 74 and into the wellbore 10, creating another pressure pulse.

A series of pressure pulses may be generated by repeatedly raising and releasing the piston 64 in the above manner. Thus, near-field pressure transients with controlled rise and fall times may be generated. The frequency, repetition time, and strength of the pressure pulses generated by the pulse generator 54 may be adjusted by controlling different variables such as, for example, the speed, the upward travel distance and/or the total raise/release cycle time of the piston 64.

Figure 6:
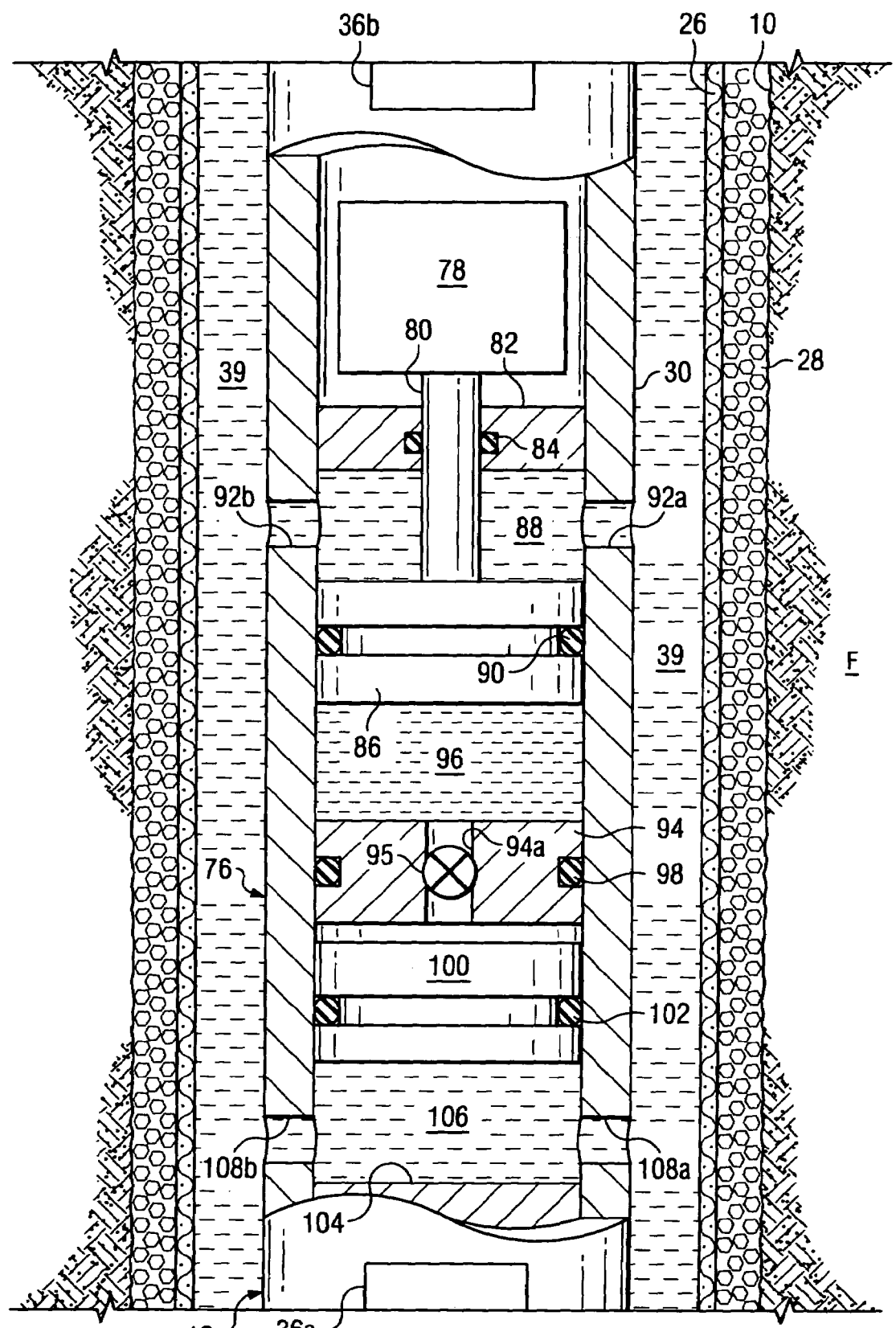
FIG. 6 is a partial elevational/partial sectional/partial schematic view, not necessarily to scale, depicting the pulse generator 34 of FIG. 1 according to another alternate embodiment.

Referring to FIG. 6, the reference numeral 76 refers, in general, to a pulse generator according to another embodiment. The pulse generator 76 includes an actuator 78 mounted in any conventional manner within the tubular body member 30, and since the actuator may be in the form of a conventional gear motor or some other type of electric or hydraulic actuator it will not be described in detail.

A shaft 80 extends downwardly from the actuator 78 and through a horizontal wall 82 that is mounted in a conventional manner in the body member 30. A seal ring 84 extends in an annular groove in the wall 82 and sealingly engages the shaft 80.

A piston 86 is connected to the shaft 80 in any conventional manner and is in sliding engagement with the inner wall of the body member. A variable-volume chamber 88 is defined within the body member 30 between the piston 86 and the wall 82 which chamber is filled with a compressible fluid. A seal ring 90 is disposed in an annular groove extending around the outer surface of the piston 86 that seals off the chamber 88 from the region of the tool 12 below the piston. The chamber 88 is in fluid communication with the annulus 39 via a plurality of ports formed in the body member 30 with two of the ports being shown by the reference numerals 92a and 92b, respectively.

A cylindrical valve body 94 is mounted in a conventional manner in the body member 30 in a spaced relation to the wall 82 and defines, with the lower surface of the piston 86 and the inner wall of the body member 30, a variable volume chamber 96 that is filled with a compressible fluid. An axial bore 94a extends through the valve body 94 and receives a valve 95 which may be in the form of a solenoid valve, or the like, that moves between closed and opened positions in response to an electrical input. A seal ring 98 is disposed in an annular groove formed in the outer surface of the valve body 94 and is in sealing engagement with the inner wall of the body member 30.

A piston 100 is disposed in the body member 30 below the valve body 95 and is in sliding engagement with the body member 30. A seal ring 102 is disposed in an annular groove formed in the outer surface of the piston 100 and is in sealing engagement with the inner wall of the body member 30.

A horizontal wall 104 is mounted to the body member 30 in any conventional manner in a spaced relation to the piston 100 to define, with the piston and the inner wall of the body member 30, a variable-volume chamber 106. The chamber 106 is in fluid communication with the annulus 39 via a plurality of ports, two of which are shown by the reference numerals 108a and 108b, respectively.

In operation, the processor 38, or equivalent electronic control circuitry at the ground surface, sends a signal to the valve 95 in any conventional manner to open it. The actuator 78 is also actuated in a similar manner and raises the shaft 80 and the piston 86 upwardly, as viewed in the drawing. As the piston 86 is raised, fluid is forced out of the chamber 88 and into the wellbore 10 via the ports 92a and 92b. As a result, the volume of the chamber 96 increases to expand the compressible fluid disposed therein, and the piston 100 is drawn upwards towards the valve 95 body, drawing fluid from the annulus 39 into the chamber 106 via the ports 108a and 108b.

After the piston 100 is at a predetermined axial position in the body member 30, the valve 95 is closed in any conventional manner, such as, for example, by an appropriate signal from the processor 38 or other equivalent electronic control circuitry. After the valve 95 closes, the actuator 78 lowers the piston 86 downward, drawing fluid from the annulus 39 into the chamber 88 via the ports 92a and 92b and compressing the fluid in the chamber 96 due to the decreasing volume of the chamber 96, creating a pressure build-up within the chamber 96.

The actuator 78 continues to lower the piston 86 downwardly until the pressure build-up in the chamber 96 reaches a predetermined level. When this occurs, the valve 95 is opened, causing an expansion of the compressible fluid in the chamber 96 and thereby pushing the piston 100 rapidly downwardly. This rapid downward movement of the piston 100 forces the production fluid in the chamber 106 out of the chamber 106 via the ports 108a, 108b at a relatively high pressure. This discharge of production fluid from the chamber 106 forms a pressure pulse which generates pressure waves in or surrounding the wellbore 10, the screen 26, the gravel pack 28 and the formation F.

To generate a second pressure pulse, the actuator 78 again draws the piston 86 upwardly, as viewed in the drawing while the valve 95 is still open, thereby drawing the piston 100 back up towards the valve 95. The above-described process is then repeated, culminating with the piston 100 rapidly forcing production fluid out of the chamber 106 and into the wellbore 10, creating another pressure pulse.

A series of pressure pulses may be generated by repeatedly raising the piston 86, closing the valve 95, lowering the piston 86 and opening the valve 95. In this manner, near-field pressure transients with controlled rise and fall times may be generated. The frequency, repetition time and strength of the pressure pulses generated by the pulse generator 76 may be adjusted by controlling different variables such as, for example, the speed of the piston 86, the upward and downward travel distances of the piston 86 and/or the total open-close-open cycle time of the valve 95.

A monitoring operation will be described with reference to FIG. 7, with continuing reference to FIGS. 1-6. In particular, at least one baseline or reference set of variable measurements are taken before the blockage-removal operation is carried out, and at least one additional set of measurements must be taken after the blockage-removal operation is carried out. The method of measurement is the same, baseline or otherwise.

Initially, one of the pulse generators 34, 54 or 76 is activated by the processor 38 and generates acoustic/seismic energy, in the form of pressure pulses with a predetermined repetition rate, in the production fluids in or surrounding the wellbore 10, the screen 26, the gravel pack 28, and the formation F in the above manner. The pressure pulses are in a predetermined frequency range that causes a periodic vibration disturbance to propagate energy through, and/or on the surface of, the fluids and cause corresponding pressure waves in the fluids. Depending upon its configuration, the pulse generator 34, 54, or 76 may generate low-frequency pressure waves that range from less than 100 Hz to a few kilohertz and propagate through, and/or on the surface of, the fluids. The hydrophones 36a, 36b, and 36c measure the variables associated with the pressure waves in the fluids caused by the pressure pulses from the pulse generator 34, 54, or 76, and output corresponding signals to the processor 38.

For each pressure pulse, two different sets of pressure-wave measurements are taken: near-field and far-field. For near-field measurement, the near-field hydrophones 36a measure variables such as the dynamic pressure levels in the fluid at each particular hydrophone 36a location over a period of time, and output signals to the processor 38 in response to the measurements. The processor 38 receives the inputs from the near-field hydrophones 36a and determines the transient pressure-pulse characteristics, including rise times, fall times, amplitudes and travel time of the pressure waves in the fluid. The processor 38 also determines the pressure-amplitude decay as a function of the distance from the pulse generator 34, 54, or 76, and the dynamic pressure slope as a function of time at each hydrophone 36a location. These determinations enable the processor 38 to characterize the spreading of the pressure waves in the near-field range of the pulse generator 34, 54, or 76.

For far-field measurement, the far-field hydrophones 36b and 36c also measure variables such as the dynamic pressure levels in the fluid at each particular hydrophone 36b and 36c location over a period of time, and output signals to the processor 38 in response to the measurements. In contrast to the near-field range, the pressure waves in the far-field range of the pulse generator 34, 54, or 76 typically develop a measurable frequency and are at least partially guided by the wellbore 10. Using programmed instructions that are based on analytical models generally known in the art, the processor 38 receives and deconvolves the inputs from the far-field hydrophones 36b and 36c, identifying and determining the characteristics of the various wave components present in the pressure waves generated by the pressure pulses, including compressional or P-waves, shear or S-waves, and surface waves (with surface referring to the production fluid/wellbore 10 interface and the production fluid/body member 30 interface). Determining the characteristics of the various wave components enables the processor 38 to characterize the spreading of the pressure waves in the far-field range. It is understood that the processing of the far-field measurements by the processor 38 may take place before, simultaneously with, intermittently with or after the processing of the near-field measurements.

As previously discussed, one monitoring cycle comprises conducting the above measurement method (including both near-field and far-field measurements) at least once before the blockage-removal operation is carried out, and at least once after the blockage-removal operation is carried out, resulting in a "before" data set and an "after" data set. To complete the monitoring cycle, further programmed instructions in the processor 38 enable the processor 38 to compare the "before" and "after" data sets, and thereby monitor the level of blockage present in and around the wellbore 10 and determine the effectiveness of the blockage-removal operation. The comparison or analysis by the processor 38 may be divided into two sub-comparisons or analyses: a near-field analysis and a far-field analysis.

For the near-field analysis, the processor 38 correlates the "before" and "after" differences in the transient pressure-pulse characteristics and the pressure-amplitude decay to the variation of the permeability within the screen 26, the gravel pack 28 and/or the formation F in the near-field range of the pulse generator 34, 54, or 76. For example, if the amplitude decay as a function of the distance from the pulse generator 34, 54, or 76 is greater in the "after" set than in the "before"

set, this may indicate that the level of permeability in the near-field range has improved due to the blockage-removal operation.

The near-field analysis is affected by the volume of fluid in the wellbore 10 and the connected pores in the screen 26, the gravel pack 28 and the formation F. If the surroundings have very large permeability, the near-field transient response will be strongly affected. Large washouts in the formation F will also strongly affect the near-field transient response. As between washouts and highly-permeable regions of the formation F, washouts will typically cause a faster spreading of the pressure waves. Actuating the pulse generator 34, 54, or 76 with several different rise times and comparing the near-field responses to the different rise times gives information for distinguishing between washouts and highly-permeable regions of the formation F. When compared with the far-field analysis, the near-field analysis may have poorer resolution with respect to detecting radial variations of the permeability in the screen 26, the gravel pack 28 and/or the formation F.

For the far-field analysis, the processor 38 correlates the differences in the characteristics of the various wave components to the variation of the permeability in the screen 26, the gravel pack 28 and/or the formation F in the far-field range of the pulse generator 34, 54, or 76. More particularly, the processor 38 may compare the "before" and "after" characteristics of the surface waves, including arrival times, amplitudes, wave-phase velocities, etc., thereby characterizing the spreading of the pressure waves before and after the blockage-removal operation.

The processor 38 may further compare the "before" and "after" calculated attenuation (or acoustic energy loss) levels and the calculated speeds of sound in order to determine the variation of the solid concentration in the production fluids in the wellbore 10, thereby quantifying the change in permeability and the corresponding effectiveness of the blockage-removal operation (a decrease in the solid concentration in the production fluid may indicate that blockage removal has occurred and permeability has improved). Thus, the level of blockage and the effectiveness of the blockage-removal operation is able to be determined over a region of the wellbore 10 that is relatively larger than the localized region associated with the near-field analysis, providing better monitoring of the blockage-removal operation. This comparison technique is disclosed in further detail in U.S. Pat. No. 6,672,163, the disclosure of which is incorporated herein by reference in its entirety.

As discussed above, the completion of a near-field analysis and a far-field analysis by the processor 38 of at least one "before" data set at a single pulse frequency and at least one "after" data set at the same pulse frequency completes one monitoring cycle. It is understood that the near-field analysis may occur before, simultaneously with, intermittently with or after the far-field analysis. It is further understood that these near-field and far-field analyses may occur almost simultaneously with, intermittently with, or after the above-described processing of the near-field and far-field measurements. Alternately, the near-field and/or far-field analyses may be integrally combined with the processing of the near-field and/or far-field measurements.

The above monitoring cycle may be performed once at a particular location of the tool 12 in the wellbore 10, in which case measurements are only taken over a period of time at one pulse frequency of the pulse generator 34, 54, or 76. However, the above cycle may include the taking of measurements at one or more additional pulse frequencies of the pulse generator 34, 54, or 76. In the near-field range, the primary benefit to this approach is that there are more measurements for the signal processor 38 to process, improving the statistical properties associated with the near-field analysis.

In the far-field range, in addition to a statistical improvement, the taking of measurements at different pulse frequencies enables the processor 38 to discriminate between the permeability levels of the screen 26, the gravel pack 28, the formation F and/or a combination thereof. Such radial discrimination of permeability is possible because the radial-penetration depth of the pressure waves is inversely proportional to the frequency of the pressure pulses generated by the pulse generator 34, 54, or 76. That is, as the frequency of the pressure pulses increases, the radial-penetration depth of the pressure waves decreases.

For example, the pulse generator 34, 54, or 76 may be operated at three different predetermined frequencies, and measurements may be taken in the above-described manner in both the near-field and far-field ranges of the pulse generator 34, 54, or 76 at each of these different frequencies. The pulse generator 34, 54, or 76 is operated at a first frequency that is relatively higher than the predetermined second and third frequencies, and the hydrophones 36a, 36b, 36c take near-field and far-field measurements that are processed by the processor 38 in the above-described manner. Next, the pulse generator 34, 54, or 76 is operated at a second frequency that is intermediate between the first and third frequencies. Measurements are again taken and processed in the above-described manner. The pulse generator 34, 54, or 76 is then operated at a third frequency that is lower than the first and second frequencies, and measurements are again taken and processed in the above-described manner.

Because the predetermined first frequency of the pressure pulses generated by the pulse generator 34, 54, or 76 is relatively high, the radial-penetration depth of the corresponding pressure waves will be relatively low, and may correspond to the radial-depth of the screen 26. Thus, the above described far-field analysis may be used to analyze the "before" and "after" data sets corresponding to the first frequency only, thereby determining the variation of permeability of the screen 26 only.

Likewise, because the predetermined second frequency of the pressure pulses generated by the pulse generator 34, 54, or 76 is lower than the first frequency yet higher than the third frequency, the radial-penetration depth of the pressure waves may correspond to the radial-depth of the gravel pack 28. Thus, the above described far-field analysis may be used to analyze the "before" and "after" data sets corresponding to the second frequency only, thereby determining the variation of permeability of the screen 26 and the gravel pack 28.

Also, since the predetermined third frequency of the pressure pulses generated by the pulse generator 34, 54, or 76 is lower than both the first and second operating frequencies, the radial-penetration depth of the corresponding pressure waves will be relatively high and therefore can penetrate the formation F. Thus, the above far-field analysis may be used to analyze the "before" and "after" data sets corresponding to the third frequency only, thereby determining the variation of permeability of the screen 26, the gravel pack 28 and the formation F.

The above-described results of the permeability variations at each of the three frequencies may be further combined and processed by the processor 38 to determine the variation of permeability as a function of radial depth from the center of the wellbore 10, thereby adequately monitoring the blockage-removal operation. As described above, it is understood that only one pressure-pulse frequency generated by the pulse generator 34, 54, or 76 is necessary to carry out the monitoring. It is further understood that each pulse generator 34, 54, or 76 may generate pressure pulses at one, two, three or more frequencies to carry out the monitoring.

The tool 12 can be moved up and down in the wellbore 10 as needed to clean and monitor the amount of blockage on different areas of the screen 26, the gravel pack 28, the formation F and the wall of the wellbore 10 in the above manner. It is understood that the above monitoring cycle or cycles can take place simultaneously with, intermittently with, or separate from, the blockage-removal operation.

One mode of operation may comprise initially moving the tool 12 down the wellbore 10, conducting a monitoring cycle or cycles at particular locations along the axis of the wellbore 10 to determine the baseline or reference permeability levels of the screen 26, the gravel pack 28 and/or the formation F. After the tool 12 is moved down past the formation F and/or the region of the wellbore 10 to be cleaned, the tool 12 may then be moved upward while conducting the blockage-removal operation. After the tool 12 is moved up past the formation F and/or the region of the wellbore 10 to be cleaned, the tool 12 may then be again moved down the wellbore 10, conducting a second monitoring cycle or cycles in order to determine the variation of permeability in the screen 26, the gravel pack 28 and/or the formation F, thereby determining the effectiveness of the blockage-removal operation.

Another mode of operation may comprise initially moving the tool 12 down the wellbore 10 while a monitoring cycle or cycles may be conducted at a particular location, immediately followed by a blockage-removal operation. This two-step, monitor-then-remove process may be repeated at additional locations further down the wellbore 10. After the tool 12 is moved down past the formation F and/or the region of the wellbore 10 to be cleaned, the tool 12 may then be moved up. While the tool 12 is moved up, only monitoring cycles at particular locations along the wellbore 10 may be conducted, or a blockage-removal operation may be conducted that is immediately followed by a monitoring cycle or cycles (a two-step, remove-then-monitor process). This mode of operation allows for a baseline permeability determination and a first cleaning during the lowering of the tool 12, followed by a permeability variation determination during the raising of the tool 12, or both a second cleaning and a permeability variation determination during the raising of the tool 12.

With reference to FIG. 8, another mode of operation may be summarized as follows. Acoustic/seismic energy is generated by the pulse generator 34, 54, or 76 in the fluids in the wellbore 10 and in the formation F in the manner discussed above. This energy is affected by any blockage occurring in the screen 26, the gravel pack 28 and/or the formation F. The hydrophones 36*a*, 36*b*, and 36*c* measure the variables associated with the pressure waves caused by the generated acoustic/seismic energy and send corresponding output signals that are received by the processor 38. The processor 38 includes instructions to process the pressure-wave measurements and compare the pressure-wave measurements with a baseline or reference set of pressure-wave measurements. The baseline set may be pre-programmed in the processor 38 and may correspond to a predetermined permeability standard such as that based on a fictional wellbore or a different wellbore than the wellbore 10. Alternately, the baseline may be based on measurements taken beforehand in the wellbore 10 and stored in the processor 38. In the event it is determined that additional blockage removal is needed, the processor 38 includes instructions to output a corresponding signal to remove at least a portion of the blockage by activating the acoustic emitter 32.

ADDITIONAL VARIATIONS

1. The number and location of the near-field and/or far-field hydrophones can be varied within the scope of the invention.

2. Other sources of acoustic/seismic energy and other pulse generators can be used in place of the pulse generator described above.

3. Other acoustic emitters can be used in place of the acoustic emitter described above.

4. Other hydrophones can be used in place of the hydrophones described above.

5. The gravel packs, including the screens, can be eliminated and blockage in other areas of the wellbore can be detected and removed.

6. The particular location of the hydrophones, the pulse generator and the acoustic emitter on the body member 30 can be varied.

7. The particular locations of other components can be varied. For example, parts or all of the processor 38 may be located near, mounted on or located in the tool 12.

8. Spatial references, such as "upper", "lower", "above", "below", "between", "vertical", "angular", etc., are for the purpose of illustration only and do not limit the specific orientation or location of the structure described above.

In the embodiment of FIGS. 3 and 4 additional bores could extend out from the axial bore 44 to additional ports formed through the body member 30.

In the embodiment of FIG. 5, instead of the chamber 68 being filled with compressible fluid, it could be in fluid communication with the wellbore 10 via a plurality of openings or ports (not shown) formed in the body member 30.

In the embodiment of FIG. 6, instead of the chamber 88 being in fluid communication with the wellbore 10 via the ports 92*a*, 92*b*, the chamber 88 could be filled with a compressible fluid and the ports 92*a* and 92*b* could be eliminated.

Although only a few exemplary embodiments of this invention have been described in detail above, those skilled in the art will readily appreciate that many other modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents, but also equivalent structures.

What is claimed is:

1. A method for determining blockage in a wellbore and/or a formation containing fluids, comprising the steps of:

generating, in the fluids, acoustic/seismic energy that is affected by the blockage;

wherein the acoustic/seismic energy is in the form of pressure pulses that cause corresponding pressure waves in the fluids;

measuring variables associated with the energy; and determining the rise times, fall times, amplitudes and travel time of the pressure waves in the fluids.

2. A method for determining blockage in a wellbore and/or a formation containing fluids, comprising the steps of:
  generating, in the fluids, acoustic/seismic energy that is affected by the blockage;
  wherein the acoustic/seismic energy is in the form of pressure pulses that cause corresponding pressure waves in the fluids;
  measuring variables associated with the energy; and
  processing the measured variables;
  wherein the variables are used to characterize the spreading of the pressure waves.

3. The method of claims 1 or 2 wherein the pressure pulses are in a predetermined frequency range that cause a periodic vibration disturbance in the fluids to propagate energy and cause the pressure waves.

4. The method of claim 3 wherein the energy is propagated through, and/or on the surface of, the fluids.

5. The method of claims 1 or 2 wherein pressure waves are measured in the fluids in the wellbore and in a relatively shallow portion of the formation.

6. The method of claims 1 or 2 wherein pressure waves are measured in the fluids in the wellbore and in the fluids in a relatively deep portion of the formation.

7. A method for determining blockage in a wellbore and/or a formation containing fluids, comprising the steps of:
  generating, in the fluids, acoustic/seismic energy that is affected by the blockage;
  wherein the acoustic/seismic energy is in the form of pressure pulses that cause corresponding pressure waves in the fluids;
  measuring variables associated with the energy;
  processing the measured variables;
  outputting a signal corresponding to the blockage;
  responding to the signal; and
  removing at least a portion of the blockage.

8. A method for determining blockage in a wellbore and/or a formation containing fluids, comprising the steps of:
  generating, in the fluids, acoustic/seismic energy that is affected by the blockage;
  wherein the acoustic/seismic energy is in the form of pressure pulses that cause corresponding pressure waves in the fluids;
  measuring variables associated with the energy;
  processing the measured variables; and
  removing at least a portion of the blockage before, during or after at least one of the generating step, the measuring step and the processing step.

9. The method of claim 8 wherein the blockage occurs on a screen/gravel pack in the wellbore.

10. The method of claim 9 wherein the step of removing comprises activating an acoustic emitter that emits acoustic signals sufficient to cause vibration of the screen/gravel pack and removal of at least a portion of the blockage.

11. The method of claim 10 further comprising, after the blockage is removed, repeating the steps of claim 1 to determine the amount of blockage removed.

12. A method for determining blockage in a wellbore and/or a formation containing fluids, comprising the steps of:
  generating, in the fluids, acoustic/seismic energy that is affected by the blockage;
  wherein the acoustic/seismic energy is in the form of pressure pulses that cause corresponding pressure waves in the fluids;
  measuring variables associated with the energy;
  processing the measured variables;
  wherein the step of generating comprises:
  disposing a tubular body member in the wellbore and spaced from the wall of the wellbore to define an annulus;
  connecting the interior of the body member and the annulus;
  selectively opening a valve in the body member to permit fluid flow between the body member and the annulus and generate the pressure pulses; and
  selectively closing the valve to prevent the fluid flow.

13. A method for determining blockage in a wellbore and/or a formation containing fluids, comprising the steps of:
  generating, in the fluids, acoustic/seismic energy that is affected by the blockage;
  measuring variables associated with the energy;
  processing the measured variables; and
  removing at least a portion of the blockage before, during or after at least one of the generating step, the measuring step and the processing step.

14. The method of claim 13 wherein the acoustic/seismic energy is in the form of pressure pulses that cause corresponding pressure waves in the fluids.

15. The method of claim 14 wherein the pressure pulses are in a predetermined frequency range that cause a periodic vibration disturbance in the fluids to propagate energy and cause the pressure waves.

16. The method of claim 15 wherein the energy is propagated through, and/or on the surface of, the fluids.

17. The method of claim 14 wherein pressure waves are measured in the fluids in the wellbore and in a relatively shallow portion of the formation.

18. The method of claim 14 wherein the processing step comprises determining the rise times, fall times, amplitudes and travel time of the pressure waves in the fluids.

19. The method of claim 14 wherein the variables are used to characterize the spreading of the pressure waves.

20. The method of claim 14 wherein pressure waves are measured in the fluids in the wellbore and in the fluids in a relatively deep portion of the formation.

21. The method of claim 13 further comprising the step of outputting a signal corresponding to the blockage.

22. The method of claim 21 further comprising the step of responding to the signal and removing at least a portion of the blockage.

23. The method of claim 13 wherein the blockage occurs on a screen/gravel pack in the wellbore.

24. The method of claim 23 wherein the step of removing comprises activating an acoustic emitter that emits acoustic signals sufficient to cause vibration of the screen/gravel pack and removal of at least a portion of the blockage.

25. The method of claim 24 further comprising, after the blockage is removed, repeating the steps of claim 13 to determine the amount of blockage removed.

26. The method of claim 13 wherein the step of generating comprises:
  disposing a tubular body member in the wellbore and spaced from the wall of the wellbore to define an annulus;
  connecting the interior of the body member and the annulus;
  selectively opening a valve in the body member to permit fluid flow between the body member and the annulus and generate the energy; and
  selectively closing the valve to prevent the fluid flow.

27. A system for determining blockage in a wellbore and/or a formation containing fluids, comprising:
- a downhole tool adapted to extend in the wellbore;
- a pulse generator mounted on the tool and adapted to generate acoustic/seismic energy that is affected by the blockage;
- a measuring unit mounted on the tool and adapted to measure variables associated with the energy;
- wherein the acoustic/seismic energy is in the form of pressure pulses that cause corresponding pressure waves in the fluids; and
- a control unit connected to the pulse generator and the measuring unit and adapted to determine the rise times, fall times, amplitudes and travel time of the pressure waves in the fluids.

28. The system of claim 27 wherein the pressure waves are measured in the fluids in the wellbore and in a relatively shallow portion of the formation.

29. A system for determining blockage in a wellbore and/or a formation containing fluids, comprising:
- a downhole tool adapted to extend in the wellbore;
- a pulse generator mounted on the tool and adapted to generate acoustic/seismic energy that is affected by the blockage;
- a measuring unit mounted on the tool and adapted to measure variables associated with the energy; and
- a control unit connected to the pulse generator and the measuring unit and adapted to process the measured variables; and
- means for removing at least a portion of the blockage.

30. The system of claim 27 wherein the pressure waves are measured in the fluids in the wellbore and fluids in a relatively deep portion of the formation.

31. The system of claim 27 or 29 wherein the variables are used to characterize the spreading of the pressure waves.

32. The system of claims 27 or 29 wherein the control unit is adapted to output a signal corresponding to the blockage.

33. The system of claim 32 further comprising means for responding to the signal and removing at least a portion of the blockage.

34. The system of claim 33 wherein the acoustic/seismic energy is in the form of pressure pulses that cause corresponding pressure waves in the fluids.

35. The system of claim 34 wherein the pressure pulses are in a predetermined frequency range that cause a periodic vibration disturbance in the fluids to propagate energy and cause the pressure waves.

36. The system of claim 35 wherein the energy is propagated through, and/or on the surface of, the fluids.

37. The system of claim 29 wherein the blockage occurs on a screen/gravel pack disposed in the wellbore and wherein the means comprises an acoustic emitter that emits acoustic signals sufficient to cause vibration of the screen/gravel pack and removal of at least a portion of the blockage.

38. A system for determining blockage in a wellbore and/or a formation containing fluids, comprising:
- a downhole tool adapted to extend in the wellbore;
- means for generating acoustic/seismic energy that is affected by the blockage;
- means for measuring variables associated with the energy;
- means for processing the measured variables; and
- means for removing at least a portion of the blockage.

39. The system of claim 38 wherein the acoustic/seismic energy is in the form of pressure pulses that cause corresponding pressure waves in the fluids.

40. The system of claim 39 wherein the pressure pulses are in a predetermined frequency range that cause a periodic vibration disturbance in the fluids to propagate energy and cause the pressure waves.

41. The system of claim 40 wherein the energy is propagated through, and/or on the surface of, the fluids.

42. The system of claim 39 wherein pressure waves are measured in the fluids in the wellbore and in a relatively shallow portion of the formation.

43. The system of claim 39 wherein the means for processing comprises means for determining the rise times, fall times, amplitudes and travel time of the pressure waves in the fluids.

44. The system of claim 39 wherein the variables are used to characterize the spreading of the pressure waves.

45. The system of claim 39 wherein pressure waves are measured in the fluids in the wellbore and fluids in a relatively deep portion of the formation.

46. The system of claim 38 further comprising means for outputting a signal corresponding to the blockage, and means for responding to the signal and removing at least a portion of the blockage.

47. The system of claim 38 wherein the blockage occurs on a screen/gravel pack disposed in the wellbore and wherein the removing means comprises an acoustic emitter that emits acoustic signals sufficient to cause vibration of the screen/gravel pack and removal of at least a portion of the blockage.

48. A computer readable medium having a plurality of instructions stored there for determining blockage in a wellbore and/or a formation containing fluids, the instructions comprising:
- generating, in the fluids, acoustic/seismic energy that is affected by the blockage;
- measuring variables associated with the energy; and
- processing the measured variables;
- wherein the acoustic/seismic energy is in the form of pressure pulses that cause corresponding pressure waves in the fluids; and
- wherein the instructions for processing comprise determining the rise times, fall times, amplitudes and travel time of the pressure waves in the fluids.

49. A computer readable medium having a plurality of instructions stored there for determining blockage in a wellbore and/or a formation containing fluids, the instructions comprising:
- generating, in the fluids, acoustic/seismic energy that is affected by the blockage;
- measuring variables associated with the energy; and
- processing the measured variables;
- wherein the acoustic/seismic energy is in the form of pressure pulses that cause corresponding pressure waves in the fluids; and
- wherein the variables are used to characterize the spreading of the pressure waves.

50. A computer readable medium having a plurality of instructions stored there for determining blockage in a wellbore and/or a formation containing fluids, the instructions comprising:
- generating, in the fluids, acoustic/seismic energy that is affected by the blockage;
- measuring variables associated with the energy; and
- processing the measured variables;
- wherein the acoustic/seismic energy is in the form of pressure pulses that cause corresponding pressure waves in the fluids; and wherein the instructions further comprise outputting a signal corresponding to the blockage, and responding to the signal and removing at least a portion of the blockage.

51. A computer readable medium having a plurality of instructions stored there for determining blockage in a wellbore and/or a formation containing fluids, the instructions comprising:
generating, in the fluids, acoustic/seismic energy that is affected by the blockage;
measuring variables associated with the energy; and processing the measured variables;
wherein the acoustic/seismic energy is in the form of pressure pulses that cause corresponding pressure waves in the fluids; and
wherein the instructions further comprise removing at least a portion of the blockage.

52. A computer readable medium having a plurality of instructions stored there for determining blockage in a wellbore and/or a formation containing fluids, the instructions comprising:
generating, in the fluids, acoustic/seismic energy that is affected by the blockage;
measuring variables associated with the energy; and processing the measured variables;
wherein the acoustic/seismic energy is in the form of pressure pulses that cause corresponding pressure waves in the fluids; and
wherein the blockage occurs on a screen/gravel pack in the wellbore.

53. The computer readable medium as in claims 48, 49, 50, 51, or 52, wherein the pressure pulses are in a predetermined frequency range that cause a periodic vibration disturbance in the fluids to propagate energy and cause the pressure waves.

54. The computer readable medium of claim 53 wherein the energy is propagated through, and/or on the surface of, the fluids.

55. The computer readable medium as in claims 48, 49, 50, 51, or 52 wherein the pressure waves are measured in the fluids in the wellbore and in a relatively shallow portion of the formation.

56. The computer readable medium as in claims 48, 49, 50, 51 or 52 wherein the pressure waves are measured in the fluids in the wellbore and in the fluids in a relatively deep portion of the formation.

57. The computer readable medium of claim 52 wherein the instructions for removing comprise instructions for activating an acoustic emitter that emits acoustic signals sufficient to cause vibration of the screen/gravel pack and removal of at least a portion of the blockage.

58. The computer readable medium of claim 57 wherein the instructions further comprise repeating the instructions of claim 53 to determine the amount of blockage removed.

59. A computer readable medium having a plurality of instructions stored there for determining blockage in a wellbore and/or a formation containing fluids, the instructions comprising:
generating, in the fluids, acoustic/seismic energy that is affected by the blockage;
measuring variables associated with the energy;
processing the measured variables; and
removing at least a portion of the blockage.

60. The computer readable medium of claim 59 wherein the acoustic/seismic energy is in the form of pressure pulses that cause corresponding pressure waves in the fluids.

61. The computer readable medium of claim 60 wherein the pressure pulses are in a predetermined frequency range that cause a periodic vibration disturbance in the fluids to propagate energy and cause the pressure waves.

62. The computer readable medium of claim 61 wherein the energy is propagated through, and/or on the surface of, the fluids.

63. The computer readable medium of claim 60 wherein pressure waves are measured in the fluids in the wellbore and in a relatively shallow portion of the formation.

64. The computer readable medium of claim 60 wherein the instructions for processing comprise instructions for determining the rise times, fall times, amplitudes and travel time of the pressure waves in the fluids.

65. The computer readable medium of claim 60 wherein the variables are used to characterize the spreading of the pressure waves.

66. The computer readable medium of claim 60 wherein pressure waves are measured in the fluids in the wellbore and in the fluids in a relatively deep portion of the formation.

67. The computer readable medium of claim 59 wherein the instructions further comprise outputting a signal corresponding to the blockage, and responding to the signal by removing at least a portion of the blockage.

68. The computer readable medium of claim 59 wherein the blockage occurs on a screen/gravel pack in the wellbore.

69. The computer readable medium of claim 68 wherein the instructions for removing comprise instructions for activating an acoustic emitter that emits acoustic signals sufficient to cause vibration of the screen/gravel pack and removal of at least a portion of the blockage.

70. The computer readable medium of claim 69 wherein the instructions further comprise repeating the instructions of claim 59 to determine the amount of blockage removed.

71. A system for determining blockage in a wellbore and/or a formation containing fluids, comprising:
a processor;
data interfaces for connecting the processor to a plurality of components in the wellbore; and
a memory accessible to the processor for storing instructions executable by the processor, the instructions including:
instructions for generating, in the fluids, acoustic/seismic energy that is affected by the blockage;
instructions for measuring variables associated with the energy;
instructions for processing the measured variables; and
instructions for removing at least a portion of the blockage.

72. The system of claim 71 wherein the acoustic/seismic energy is in the form of pressure pulses that cause corresponding pressure waves in the fluids.

73. The system of claim 72 wherein the pressure pulses are in a predetermined frequency range that cause a periodic vibration disturbance in the fluids to propagate energy and cause the pressure waves.

74. The system of claim 73 wherein the energy is propagated through, and/or on the surface of, the fluids.

75. The system of claim 72 wherein pressure waves are measured in the fluids in the wellbore and in a relatively shallow portion of the formation.

76. The system of claim 72 wherein the instructions for processing comprise instructions for determining the rise times, fall times, amplitudes and travel time of the pressure waves in the fluids.

77. The system of claim 72 wherein the variables are used to characterize the spreading of the pressure waves.

78. The system of claim 72 wherein pressure waves are measured in the fluids in the wellbore and in the fluids in a relatively deep portion of the formation.

79. The system of claim 71 wherein the instructions further comprise outputting a signal corresponding to the blockage, and responding to the signal by removing at least a portion of the blockage.

80. The system of claim 71 wherein the blockage occurs on a screen/gravel pack in the wellbore.

81. The system of claim 80 wherein the instructions for removing comprise instructions for activating an acoustic emitter that emits acoustic signals sufficient to cause vibration of the screen/gravel pack and removal of at least a portion of the blockage.

82. The system of claim 81 wherein the instructions further comprise repeating the instructions of claim 71 to determine the amount of blockage removed.

83. A system for determining blockage in a wellbore and/or a formation containing fluids, comprising:
  a processor;
  data interfaces for connecting the processor to a plurality of components in the wellbore; and
  a memory accessible to the processor for storing instructions executable by the processor, the instructions including:
  instructions for generating, in the fluids, acoustic/seismic energy that is affected by the blockage;
  instructions for measuring variables associated with the energy; and
  instructions for processing the measured variables;
  wherein the acoustic/seismic energy is in the form of pressure pulses that cause corresponding pressure waves in the fluids.

84. The system of claim 83 wherein the pressure pulses are in a predetermined frequency range that cause a periodic vibration disturbance in the fluids to propagate energy and cause the pressure waves.

85. The system of claim 84 wherein the energy is propagated through, and/or on the surface of, the fluids.

86. The system of claim 83 wherein pressure waves are measured in the fluids in the wellbore and in a relatively shallow portion of the formation.

87. The system of claim 83 wherein the instructions for processing comprise instructions for determining the rise times, fall times, amplitudes and travel time of the pressure waves in the fluids.

88. The system of claim 83 wherein the variables are used to characterize the spreading of the pressure waves.

89. The system of claim 83 wherein pressure waves are measured in the fluids in the wellbore and in the fluids in a relatively deep portion of the formation.

90. The system of claim 83 wherein the instructions further comprise outputting a signal corresponding to the blockage, and responding to the signal and removing at least a portion of the blockage.

91. The system of claim 83 wherein the instructions further comprise removing at least a portion of the blockage.

92. The system of claim 91 wherein the blockage occurs on a screen/gravel pack in the wellbore.

93. The system of claim 92 wherein the instructions for removing comprise instructions for activating an acoustic emitter that emits acoustic signals sufficient to cause vibration of the screen/gravel pack and removal of at least a portion of the blockage.

94. The system of claim 93 wherein the instructions further comprise repeating the instructions of claim 83 to determine the amount of blockage removed.

95. An apparatus for generating pressure pulses downhole in a wellbore, comprising:
  a tubular body member disposed in the wellbore and spaced from the wall of the wellbore to define an annulus, wherein the body member is adapted to receive pressurized fluid;
  a fluid flow passage connecting the interior of the body member and the annulus; and
  a valve disposed in the passage and adapted to open to permit fluid flow between the body member and the annulus and generate the pressure pulses, and to close to prevent the fluid flow.

96. The apparatus of claim 95 wherein the pressurized fluid is introduced into the body member and flows to the annulus.

97. The apparatus of claim 95 wherein the pressurized fluid is introduced into the annulus and flows to the body member.

98. The apparatus of claim 95 further comprising a solid body member disposed in the tubular body member, wherein the solid body member has at least one channel formed therein to receive the pressurized fluid.

99. The apparatus of claim 98 wherein the passage is formed through the solid body member and extends between the channel and the annulus.

100. The apparatus of claim 95 wherein the annulus contains production fluid and wherein the pressure pulses are generated in the production fluid.

101. A method for generating pressure pulses downhole in a wellbore, comprising the steps of:
  disposing a tubular body member in the wellbore and spaced from the wall of the wellbore to define an annulus, wherein the body member is adapted to receive pressurized fluid;
  connecting the interior of the body member and the annulus;
  selectively opening a valve in the body member to permit fluid flow between the body member and the annulus and generate the pressure pulses, and
  selectively closing the valve to prevent the fluid flow.

102. The method of claim 101 further comprising the step of introducing the pressurized fluid into the body member so that it flows to the annulus.

103. The method of claim 101 further comprising the step of introducing the pressurized fluid into the annulus so that it flows to the body member.

104. The method of claim 101 wherein the annulus contains production fluid and wherein the pressure pulses are generated in the production fluid.

* * * * *